Oct. 31, 1961 F. J. BORON 3,006,625
FURNACE SHAFTS
Filed Sept. 16, 1959
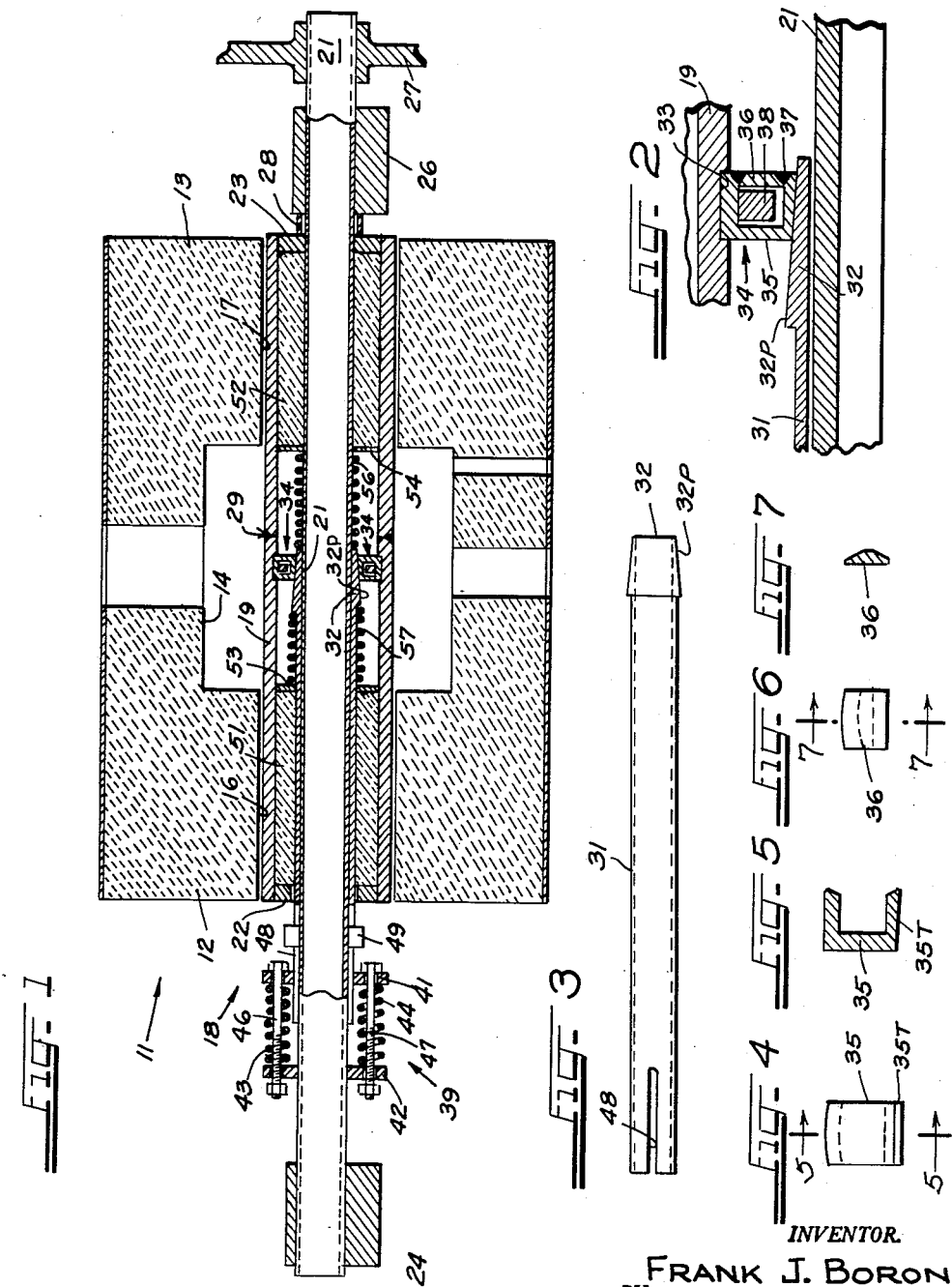
INVENTOR.
FRANK J. BORON
BY
Wallace and Cannon
Att'ys.

— # United States Patent Office 3,006,625
Patented Oct. 31, 1961

3,006,625
FURNACE SHAFTS
Frank J. Boron, Elyria, Ohio, assignor to American Brake Shoe Company, New York, N.Y., a corporation of Delaware
Filed Sept. 16, 1959, Ser. No. 840,321
8 Claims. (Cl. 263—6)

This invention relates to a roller support shaft for use in a high temperature furnace. More specifically, this invention relates to an arrangement for supporting such a shaft on an inner, fluid-cooled shaft.

It is a characteristic of metals that the yield stress, which is the stress beyond which an increase in load causes a non-elastic deformation resulting in permanent deformation, decreases quite markedly with increased temperatures. There are many applicatoins in which a load supporting shaft fabricated from a metal or metal alloy is subjected to high ambient temperatures for sufficient periods of time so as to result in the temperature of the shaft becoming substantially the same as the ambient temperature. As an example, these are the conditions that are present in a heat-treating furnace of the type which incorporates one or more rotatable shafts for moving objects through the furnace at a predetermined rate. In heat-treating furnaces of this type, and in most other structural applications, permanent deformation of the metal components cannot be tolerated, so that the allowable design stress imposes a very serious limitation on the loads that can be put on top of the rotatable shafts.

In heat-treating furnaces of the general type mentioned above, it is the usual practice to extend the shafts across the width of the furnace and support the object being heat treated on the central portion of the shaft. In an attempt to obtain larger load carrying capacities for such shafts it has been proposed to support the central portions of such shafts, as by forming such shafts in a tubular configuration and inserting a water-cooled support tube therein. The greatest obstacle to this approach is the differential expansion of the outer and inner tubes which is inherent in such an arrangement. Thus, the water-cooled inner tube remains at substantially a constant temperature so as to have little or no thermal expansion, whereas the outer tube is much more subject to temperature variations and expands away from the inner, water-cooled support tube. With such an arrangement the outer shaft can be perfectly supported at one particular temperature, but the problem is to maintain the support throughout various degrees of differential expansion of the two shafts caused by varying temperatures.

It has also been proposed to use a spring arrangement for supporting such a high temperature shaft, but with the higher temperatures often engendered in such heat-treating furnaces, such as temperatures in the neighborhood of 2200° F., the elastic limit of the spring, like the shaft, is quite low. Thus, such springs can afford little effective support without being subjected to overloads and a permanent set at these high temperatures.

There is a functional relationship between the expansion of the diameter of a shaft and the linear expansion of the shaft caused by temperature variations, and it is a primary object of this invention to utilize this relationship in a manner such that an outer load-bearing shaft, which is subjected to high temperatures, is supported from an inner low temperature shaft throughout the complete range of temperatures to which the outer shaft may be subjected.

In accordance with this invention an outer high temperature shaft and an inner water-cooled shaft are connected together at one end so that thermal expansion of the outer shaft moves the outer shaft longitudinally of the inner shaft in a direction away from the inter-connected ends. A camming device having a contour formed in accordance with the above mentioned functional relationship is mounted on the inner shaft, and force transmitting devices are mounted within the outer shaft in a manner such that the latter devices are slidable along the cam contour by linear expansion of the outer shaft and thereby maintained in continuous engagement with the cam. Thus, for any differential temperature between the outer and inner shafts the outer shaft is continuously supported from the inner shaft. It is another object of this invention to so construct a load bearing member as to incorporate in a novel and efficacious manner the foregoing structural arrangement.

Other and further objects of the present invention will be apparent from the following description and claims and are illustrated in the accompanying drawings which, by way of illustration, shows a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is an elevation view, in section, of a furnace which incorporates a high temperature shaft arrangement constructed in accordance with this invention;

FIG. 2 is a fragmentary detail view of a central portion of the shaft arrangement illustrated in FIG. 1;

FIG. 3 is a view of a floating support tube incorporated in the arrangement illustrated in FIG. 1;

FIG. 4 is an end elevation view of a channel member incorporated in the arrangement illustrated in FIG. 1;

FIG. 5 is an elevation view, in section, taken in the direction of the arrows 5—5 in FIG. 4;

FIG. 6 is an end elevation view of a support piece incorporated in the arrangement illustrated in FIG. 1; and FIG. 7 is an elevation view, in section, taken in the direction of the arrows 7—7 in FIG. 6.

For the purpose of describing a specific embodiment of this invention, a shaft assembly constructed in accordance with the present invention is illustrated as incorporated in a heat-treating furnace. The heat-treating furnace is of the type in which a plurality of shafts are rotatably mounted so as to extend inward through the side walls of the furnace and serve as rollers for transporting a continuous stream of objects to be heat treated through the interior of the furnace at a predetermined rate and thereby enable the objects to be heat treated at a desired temperature for a selected period of time. While the shaft assembly constructed in accordance with this invention is illustrated as being incorporated in such a heat treating furnace, it will be recognized that the shaft assembly of this invention is not limited solely to use in such furnaces but may equally well be utilized in other high temperature applications wherein it is desirable to obtain the increased load capacity afforded by the novel support arrangement of this invention.

Referring now to FIG. 1, a heat-treating furnace is indicated generally by the reference numeral 11 and includes spaced side walls 12 and 13 constructed of fire brick and defining a heating chamber 14 therebetween. The walls 12 and 13 are constructed to have relatively large openings 16 and 17 which are aligned one with another and open into the chamber 14. These openings serve to support a rollershaft means 18 enabling an object to be heat treated within the chamber 14 as will be described.

The shaft means 18 comprises an outer tubular shaft 18 and an inner tubular shaft 21. The outer shaft 19 is of shorter length than the inner shaft 21, and support disks 22 and 23 extend radially inwardly from the inner periphery of the ends of the shaft 19 for supporting the ends of the shaft 19 from the inner shaft 21. The support disk 23 is fixed to both of the shaft 19 and 21, while the support disk 22 is fixed to the outer shaft 19 but is freely movable in a longitudinal direction along the inner shaft 21. The reason for this particular manner of connecting the supporting disks will presently be described. The inner shaft 21 is, in turn, mounted within a pair of pillow blocks 24 and 26.

The shafts 19 and 21 are rotatable as a unitary assembly by means of a drive sprocket 27 which is fixed to one end of the inner shaft 21. As illustrated in FIG. 1 a spacer collar 28 may be interposed between the pillow block 26 and the spacer disk 23 to maintain horizontal alignment of the shaft assembly 18 within the heat-treating furnace 11.

Thus, it will be apparent that a number of such craft assemblies or rollers 18 may be mounted in closely spaced relation within the heat-treating furnace 11, so that an object to be heat treated may be placed on the upper periphery of the outer shafts and transported through the furnace by rotation of the rollers.

The central portion of the outer shaft 19 is directly exposed to the high ambient temperatures within the chamber 14 and therefore is fabricated from a heat-resistant alloy so as to better resist oxidation by reason of such high temperatures. The outer shaft 19 may be formed in two or more sections by centrifugally casting the sections, and these sections are abutted and welded together as at 29.

As illustrated in FIG. 1, the inner shaft 21 is of a tubular construction and is adapted to have a suitable liquid, such as water, circulated within the interior thereof to maintain the inner shaft 21 at a substantially constant temperature, which temperature is relatively low as compared to the temperatures generated within the chamber 14. By thus cooling the inner shaft 21 the inner shaft may be fabricated of an inexpensive mild steel and still afford sufficient strength to support the loads imposed by the objects being heat treated without exceeding the elastic limits of the material of which the inner shaft is composed.

On the other hand the outer shaft 19 is directly exposed to the heat within the chamber 14 so that the temperature of the shaft 19 becomes substantially the same as that within the chamber 14. As described hereinabove, such high temperature levels decrease the allowable stress level within the outer shaft 19, even though the shaft is composed of a high alloy steel, so that it is necessary to provide some means for supporting the central portion of the shaft 19 to prevent the load imposed on the shaft from causing a stress exceeding the yield stress at the elevated temperature from being developed within the shaft and thereby causing permanent deformation of the outer shaft.

As mentioned hereinabove the inner and outer shafts are connected together at one end of each shaft by the support disk 23, while the opposite ends of the shafts and all portions intermediate the ends thereof are free to move relative to one another. There is a functional relationship between the radial and the linear thermal expansion of the outer shaft 19, and the support arrangement of this invention utilizes that relationship to enable the outer shaft to be continuously supported from the inner shaft regardless of the expansion or contraction of the diameter of the outer shaft with temperature variations within the chamber 14.

The means for accomplishing this desirable result include a floating support sleeve 31 which is separately shown in plan view in FIG. 3. The sleeve 31 encircles a portion of the inner shaft 21 and includes a tapered head or cam 32 at one end thereof. The outer periphery or contour of the cam 32 is of a generally truncated conical configuration thus being wedge-shaped in cross section as viewed in FIGS. 1, 2, and 3 and is designated by the reference numeral 32P. The exact contour of this tapered surface is determined in accordance with the functional relationship between the radial and linear thermal expansion of the outer shaft 19.

As best viewed in FIG. 2 the inner surface of the shaft 19 is formed with an annular recess 33 and a plurality of segments 34 of a ring are circumferentially spaced from one another and mounted within the recess 33 so as to engage the surface 32P of the cam. The segments 34 are slidable along the surface 32P of the cam by the longitudinal expansion and contraction of the shaft 19 caused by varying temperature differentials between the shafts 19 and 21 so that the segments 34 constitute means for transmitting the load from the center outer shaft to the cam 32 and the inner shaft 21. The segments 34 are equally spaced one from another and are preferably at least four in number so that the load from the outer shaft is effectively transmitted to the inner shaft regardless of the angular position of rotation of the two shafts.

With particular reference now to FIGS. 2 and 4-7, each of the segments 34 comprises a channel member 35 and a support piece 36. Each channel member has a lower tapered surface 35T which is complementary to the taper of the cam 32 so as to mate flush therewith. The support piece 36 is adapted to be welded within the open side of the channel member as by welds 37, FIG. 2. This manner of assemblying the segments 34 enables the segments to be assembled on a ring 38 which is thereby trapped within the cage formed by the channels 35 and the supporting pieces 38.

Because the segments 34 are circumferentially spaced from one another problems of stresses due to the differential temperature between the inner and outer ends of the segments are avoided. Also the connection between the inner ring 38 and a segment 34 is maintained very loose, as best illustrated in FIG. 2, to avoid problems due to differential heating of the inner and outer portions of the ring.

The tapered contour of the cam 32 is such that the sliding movement of the segments 34 on the surface of the cam should enable the segment and the cam to be maintained in continuous engagement throughout the complete range of temperatures to which the outer shaft 19 may be subjected. It is possible that there may be some slight variations in the dimensions of the parts, or an unexpected condition may be encountered, such that the segments 34 would exert an excessive push on the cam 32 during longitudinal expansion of the shaft 19, leftward as illustrated in FIG. 2, as an incident of a temperature rise in the shaft 19.

For the purpose of taking up such an excessive push the sleeve 31 is provided with a spring or lost-motion arrangement 39 at the end opposite that formed with the cam 32. As viewed in FIG. 1 the sleeve 31 has a radially outwardly directed flange 41 welded adjacent an end thereof, and the inner shaft 21 also has a radially outwardly directed flange 42 attached thereto so as to be spaced from the flange 41. A pair of coil springs 43 and 44 are interposed between the flanges 41 and 42 and retained in position by a pair of bolts 46 and 47. Thus, upon the segments 34 exerting an excessive longitudinal force on the cam 32 the sleeve member 31 is moved longitudinally of the inner shaft 21, leftwardly as viewed in FIG. 1, to compress the springs 43 and 44. The springs are only lightly loaded, exerting a force of approximately 20 pounds, and additionally function to bias the sleeve 31 and cam 32 in a longitudinal direction, rightwardly as viewed in FIG. 1, to maintain the cam 32 and the segments 34 in engagement as by pushing the tapered cam back upon a decrease in the temperature of the outer shaft 19.

As illustrated in FIG. 3 the sleeve 31 is formed with a pair of slots 48 which cooperate with a pair of keys 49 fixed on the shaft 21 for maintaining angular alignment of the sleeve with the inner shaft 21.

It is important that the support disks 22 and 23 be insulated from the heat within the chamber 14 and for this purpose the space between the end portions of the shafts 19 and 21 that are disposed within the apertures 16 and 17 are packed with insulation as 51 and 52. Such insulation is maintained in position by a pair of retainer rings 53 and 54.

It is also desirable that the central portion of the inner shaft 21, which is intermediate the retainer rings 53 and 54, be shielded from the heat within the chamber 14 which is transmitted through the central portion of the outer tube 19. For this purpose insulation, which may preferably be in the form of an asbestos rope, is wound about the periphery of the inner shaft 21 between the cam 32 and the retainer plate 54. This insulation is indicated by the reference numeral 56 in FIG. 1. Similarly, insulation is wound about the sleeve 31 between the cam 32 and the plate 53 as indicated by the reference numeral 57.

While the operation of the structural components of this invention has been described in conjunction with the detailed description of the various figures of the drawings, the overall operation will now be briefly summarized. An object to be heat treated is placed upon the upper surface of one or more rollers like the shaft assembly 18 for transport through the furnace 11 by rotation of the drive sprocket 27. The load imposed on the outer shaft 19 by such an object is transmitted to the inner shaft 21 by the support disks 22 and 23 and the ring segments 34. Thus, the inner shaft 21 constitutes the main load-bearing member of the shaft assembly.

The shaft assembly 18 is subjected to varying temperatures within the heated chamber 14 so that the temperature differential between the outer shaft 19 and the inner liquid-cooled shaft 21 varies over a considerable range. As a result of such varying temperature differentials between the shafts, the outer shaft varies both in length and in diameter with respect to the inner shaft. Since one end of the shaft 19 is fixed by the disk 23 to the inner shaft, any variation of the temperature of the outer shaft causes a corresponding displacement of the center portion of the outer shaft with respect to the center portion of the inner shaft. Assuming that the temperature of the outer shaft is increasing with respect to the inner shaft 21, the ring segments 34 are moved leftwardly, as viewed in FIG. 1, by the resulting linear expansion of the shaft 19. Simultaneous with such linear expansion there occurs an expansion in the internal diameter of the shaft 19, but the taper of the contour of the cam 32 compensates for this diameter increase so that, as the ring segments 34 are moved leftwardly and upwardly by such an increase in temperature, the peripheral surface 32P of the cam is increased in diameter to maintain engagement between the cam and the ring segments and thus between the inner and outer shafts. In like manner the cam 32 and the ring segments 34 enable the outer shaft 19 to be centrally supported from the inner shaft on a decrease in temperature of the outer shaft, which causes the shaft to contract in both length and diameter.

Should there be some slight variation in the dimension of the component parts such as might cause excessive longitudinal forces to be developed between the cam 32 and the ring segments 34, the springs 43 and 44 permit the sleeve 31 and the cam member 32 to shift a slight amount in a longitudinal direction and thereby relieve such forces. The springs 43 and 44 also bias the cam 32 to maintain engagement with the ring segments 34 whenever the conditions causing such excessive forces to be developed no longer occur.

Hence, while I have illustrated and described a preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A support assembly adapted to be continuously subjected to high ambient temperatures comprising, an outer tubular shaft, an inner support shaft adapted to be cooled below the temperature of said outer shaft, support means for supporting said outer shaft from the inner shaft at the ends of the outer shaft, said support means interconnecting the shafts at one end of each shaft, the opposite ends of the shafts and the portions intermediate the ends thereof being free for relative longitudinal movement with respect to one another upon variations in the differential temperatures of the shafts, and additional support means for supporting a central portion of said outer shaft, said additional support means including a first member having an inclined surface and mounted on the inner shaft with the high part of said inclined surface being disposed toward said opposite free ends of the shafts, and a second member mounted within the outer shaft and secured thereto for movement therewith, said second member being slidable along said inclined surface by relative longitudinal movement of said shafts to compensate for a change in the relative diameters of said shafts simultaneously with said relative diameters of said shafts simultaneously with said relative longitudinal movement of the shafts upon variations in the diqerential temperature of the shafts.

2. A load-bearing support adapted to extend across the interior of a furnace and including an outer hollow shaft adapted to be exposed to the ambient temperature within the furnace, an inner liquid-cooled hollow shaft disposed within the outer shaft in spaced relation therewith, and means for continuously supporting a central portion of the outer shaft from the inner shaft for all temperature variations between the outer and inner shafts, said means comprising, a connection between the shafts adjacent one end of each shaft, the opposite ends of the shafts being free for relative movement with respect to one another upon variations in the differential temperature of the shafts, substantially wedge-shaped cam means mounted on the inner shaft intermediate the ends thereof and so located thereupon that the high part thereof is disposed toward said opposite free ends of said shafts, and force transmitting means mounted within the outer shaft, said force transmitting means being slidable along the contour of the cam means by said relative movement of the shafts and continuously engaged with the cam means to thereby transmit loading forces from the outer shaft to the inner shaft .

3. A load bearing support as defined in claim 2, wherein said cam means include a sleeve member disposed in encircling relation with a portion of the inner shaft, said sleeve member being slidable along the inner shaft, and wherein resilient means are mounted on said inner shaft and connected to said sleeve member for biasing the cam means toward said force transmitting means to insure said continuous engagement of the force transmitting means with the cam means.

4. A load bearing support as defined in claim 2, wherein said support is rotatable, and wherein said cam means encircle the inner shaft and have a truncated conical outer surface and wherein said force transmitting means comprise circumferentially spaced segments of a ring.

5. A load bearing support as defined in claim 2, wherein support disks are extended radially inwardly at the ends of said outer shaft for additionally supporting said outer shaft on said inner shaft.

6. A load bearing support as defined in claim 5, wherein packed insulation is interposed between said shafts at the end portions thereof to insulate said support disks and wherein additional insulation is coiled about the central portion of the shaft adjacent the contour of the cam means.

7. In a furnace of the kind described, a rotatable load-bearing support extended across the interior of the furnace and including both an outer hollow shaft adapted to be subjected to the ambient temperature within the furnace and an inner shaft disposed within the outer shaft in spaced relation therewith, means for supporting the outer shaft from the inner shaft for all temperature variations between the outer and inner shafts and comprising, a connection between the shafts adjacent one end of each shaft, the opposite ends of the shafts being free for relative movement with respect to one another upon variations in the differential temperature of the shafts, annular cam means substantially wedge-shaped in section and mounted on the inner shaft on a central portion thereof, and force transmitting means mounted within the outer shaft, said force transmitting means including an outer portion in contact with the inner circumference of said outer shaft and an inner portion having a surface shaped complemental to and in contact with the outer surface of said cam means and being slidable along the cam means by said relative movement of the shafts to thereby transmit loading forces from the outer shaft to the inner shaft.

8. A support assembly adapted to be continuously subjected to high ambient temperatures and comprising, an outer tubular shaft, an inner support shaft adapted to be cooled below the temperature of said outer shaft, said outer shaft being movable in longitudinal and radial directions with respect to said inner shaft by a varying temperature differential between said shafts, and support means for supporting a central portion of said outer shaft from the inner shaft for any temperature differential therebetween, said support means comprising first and second members each having mating complementary tapered surfaces, said first member being mounted on the inner shaft, and said second member being fixed for longitudinal movement with said outer shaft in a manner such that the tapered surface of said second member is substantially continuously in slidable contact with the tapered surface of said first member during longitudinal and radial movement of said outer shaft.

References Cited in the file of this patent

UNITED STATES PATENTS

| | | |
|---|---|---|
| 1,097,303 | Costello | May 19, 1914 |
| 1,657,212 | Hitchcock | Jan. 24, 1928 |
| 2,014,302 | Waldron | Sept. 10, 1935 |
| 2,025,547 | Ornitz | Dec. 24, 1935 |
| 2,267,727 | Gardner | Dec. 30, 1941 |
| 2,651,241 | Hornbostel | Sept. 8, 1953 |
| 2,772,872 | Ornitz | Dec. 4, 1956 |